United States Patent [19]
Kōmoto

[11] 4,445,756
[45] May 1, 1984

[54] REFLEX ZOOM LENS BARREL

[76] Inventor: Shinsuke Kōmoto, c/o Asahi Kogaku Kogyo K.K., 36-9, Maenocho 2-chome, Itabashi-ku, Tokyo, Japan, 174

[21] Appl. No.: 349,514

[22] Filed: Feb. 17, 1982

[30] Foreign Application Priority Data

Feb. 24, 1981 [JP] Japan ............................. 56-25097[U]
Feb. 24, 1981 [JP] Japan ................................ 56-25986

[51] Int. Cl.³ ..................... G02B 15/16; G02B 17/08; G02B 7/10
[52] U.S. Cl. .................................. 350/429; 350/427; 350/444
[58] Field of Search ............... 350/429, 430, 427, 423, 350/444, 505, 560

[56] References Cited

U.S. PATENT DOCUMENTS

| | | |
|---|---|---|
| 3,529,888 | 9/1970 | Buchroeder . |
| 3,889,282 | 6/1975 | Hashimoto . |
| 4,128,305 | 12/1978 | Liu . |
| 4,171,880 | 10/1979 | Mori et al. . |
| 4,273,425 | 6/1981 | Canzek . |

FOREIGN PATENT DOCUMENTS

852302 10/1960 United Kingdom ................ 350/423

Primary Examiner—Jon W. Henry
Attorney, Agent, or Firm—Merchant, Gould, Smith, Edell, Welter & Schmidt

[57] ABSTRACT

A reflex zoom lens barrel comprising a front frame which carries reflex optical lens means having a positive focal length, a rear frame which carries transmission optical lens means having a negative focal length, zooming means for moving the front and rear frames in optical axial direction, to vary a focal length of a combination of the reflex and transmission optical lens means, and focusing means for independently moving only the front frame in the optical axial directions.

8 Claims, 5 Drawing Figures

REFLEX ZOOM LENS BARREL

PRIOR ART STATEMENT

U.S. Pat. No. 4,171,880 discloses a mechanism of one-hand zoom lens barrel. U.S. Pat. No. 3,889,282 discloses a mechanism of two-hand zoom lens barrel. U.S. Pat. Nos. 3,529,888, 4,273,425 and 4,128,305 disclose examples of lens arrangements for reflex lens system.

This invention relates to a reflex zoom lens barrel having two groups of lenses with reflective optical lens means.

Reflex lenses with reflex optical means are on the market and used as small and light supertelephoto lenses, since the reflex lenses have a long optical path length.

A zoom lens consisting of front and rear groups of lenses has been lately proposed. However, conventional zoom lenses are of retro focus types in which the front group of lenses have a negative focal length and the rear group of lenses have a positive focal length. There is not a telephoto type zoom lens in which the front and rear groups of lenses have positive and negative focal lengths, respectively. There is up-to-dately no super-telephoto zoom lens.

There are known two zoom lens actuation systems, one being a one-hand zoom in which focusing and zooming are effected by a single actuation ring, and the other system being a two-hand zoom in which focusing and zooming are effected by respective actuation rings. One-hand zoom has an advantage that focusing and zooming can be rapidly effected at one time. However, in the one-hand zoom, it is very difficult to effect zooming, independently of focusing. On the other hand, the two-hand zoom has an advantage that zooming can be effected independently of focusing, but a rapid zooming cannot be expected in the two-hand zoom. Furthermore, when front group cam grooves which control the optical position of the front group lenses include an inflection point or the like, like a retro focus type of zoom lens which includes front group of lenses having negative focal length and rear group of lenses having positive focal length, it is very difficult to provide a one-hand zoom type of zoom lens actuation mechanism, because of the presence of such cam grooves.

The primary object of the present invention is, therefore, to provide a simple small and light zoom lens barrel having reflex optical lens means.

Another object of the present invention is to provide a reflex zoom lens barrel in which zooming can be effected either by an independent zooming operation ring or by a front frame which holds the front group of lenses to effect focusing.

Still another object of the present invention is to provide a reflex zoom lens barrel which includes a minimum number of components or elements for supporting optical lens means and for effecting focusing and zooming.

In view of the fact that a reflex lens has a long focal length and is small and light and that no telephoto type zoom lens having two groups of lenses is commercialized, according to the present invention, the front group of lenses consist of reflex optical lenses having a positive focal length and the rear group of lenses consist of transmission optical lenses having a negative focal length.

In order to achieve the objects of the present invention, mentioned above, the reflex zoom lens barrel according to the present invention has a front frame which supports the reflex optical lenses and a rear frame which supports the transmission optical lenses. The front and rear frames can be displaced in a direction of an optical axis by means of a zooming mechanism while keeping a predetermined positional relationship to a mount securing barrel, so that focal length of the reflex optical lenses and the transmission optical lenses vary. Furthermore, the front frame can be displaced by a focusing mechanism, independently of the rear frame.

According to an aspect of the present invention, on the one hand focusing and zooming can be effected at one time by the front frame which supports the front group of reflex optical lenses, and on the other hand, zooming can be effected also by a zooming ring, independently of focusing.

In the detailed description of the preferred embodiments of the invention presented below, reference is made to the accompanying drawings, in which.

Figure 1:
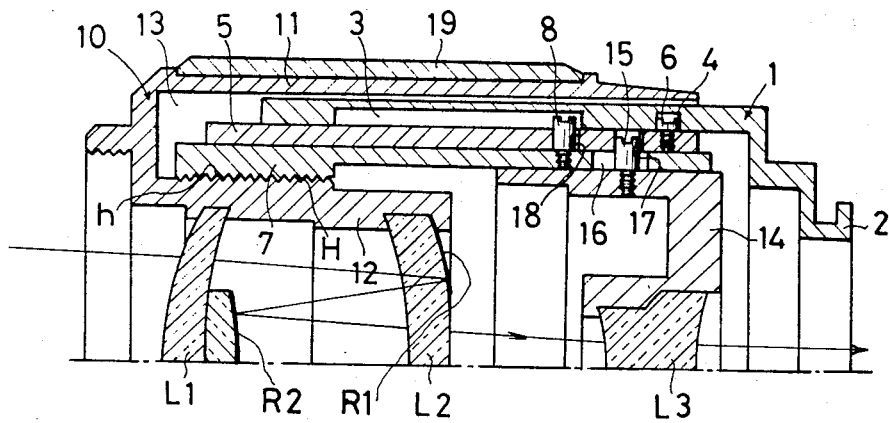
FIG. 1 is a longitudinal side sectional view of an upper half of a reflex zoom lens barrel according to the present invention.

In FIG. 1 which shows a one-hand zoom type of reflex zoom lens barrel, a mount securing barrel 1 is provided, on its rear end, with a mount 2 which is adapted to attach the barrel to a camera body (not shown). The barrel 1 has an inner periphery having an axial groove 3 extending along the optical axis and a peripheral groove 4 extending perpendicular to the axial groove 3. A zooming ring 5 which is fitted in the barrel 1 has a pin which is received in the peripheral groove 4 of the barrel 1, so that the zooming ring 5 can only rotate about the optical axis without moving in the axial direction relative to the barrel 1. That is, the engagement of the pin 6 in the peripheral groove 4 prevents the occurrence of a relative axial movement between the zooming ring 5 and the barrel 1.

An outer helicoid ring 7 which is fitted in the zooming ring 5 has a pin 7 which extends into the axial groove 3 of the barrel 1, so that the outer helicoid ring 7 can move only in the axial direction without rotating about the optical axis.

A front frame 10 which supports the front group of lenses has an outer annular actuating portion 11 and an inner annular supporting portion 12 which defines, together with the actuating portion 11, and annular space 13 therebetween which receives therein the barrel 1, the zooming ring 5 and the outer helicoid ring 7. The supporting portion 12 of the front frame 10 is provided, on its outer periphery, with an inner helicoid h which can be engaged by an outer helicoid H formed on the outer helicoid ring 7.

A rear frame 14 which supports the rear group of lenses is fitted in the outer helicoid ring 7 at the rear portion of the latter and has a pin 15 which extends through an axial groove 16 formed in the helicoid ring 7 and which is fitted in a rear straight lead groove 17 of the zooming ring 5, which is inclined with respect to the optical axis.

Figure 2:
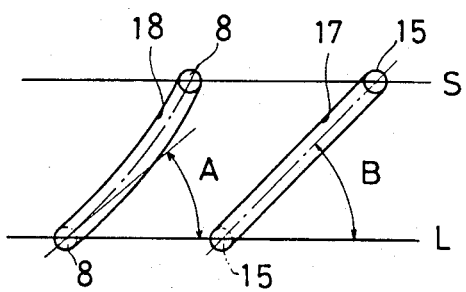
FIG. 2 is a developed view of front cam groove and rear land groove of a zooming ring.

The zooming ring 5 has, in addition to the lead groove 17, a curved cam groove 18 which is inclined in the same direction as the lead groove 17. The pin 8 of the helicoid ring 7 extends through the cam groove 18. A relative positional relationship between the front and rear frames 10 and 14, which provides a desired zooming depends on the profiles of the grooves 17 and 18 and on the inclination of the curved groove 18. The lines S and L in FIG. 2 represent the positions of the pin 8 in the groove 18 and pin 15 in the groove 17 at a short focal length and at a long focal length, respectively. The numeral 19 designates a face ring for actuating the front frame 10.

The reflex optical lens means held by the supporting portion 12 of the front frame 10 has a positive focal length and consists of the front group of lenses L1 having a second reflecting surface R2 and the rear group of lenses L2 having a first reflecting surface R1.

Transmission optical lens means L3 is held by the rear frame 14. Light (designated by an arrow in FIG. 1) passing through the peripery of the front group of lenses L1 is reflected by the first reflecting surface R1 of the rear group of lenses L2, comes to the second reflecting surface R2 of the front group of lenses L1, and is, then, reflected by the second reflecting surface. The light reflected by the second reflecting surface R2 of the lenses L1 passes through the center portion of the rear group of lenses L2 and then through the transmission optical lens means L3, and finally reaches an image plane. It should be noted that since the front group of lenses are reflex optical lens means in the present invention, a mechanical diaphragm can be dispensed with.

Figure 3:
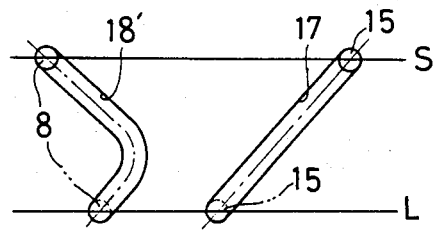
FIG. 3 is a developed view of front cam groove and rear lead groove of a retro focus type of zoom lens; and, FIGS. 4 and 5 are longitudinal side sectional views of parts of a reflex zoom lens barrel according to different embodiments of the present invention.

As can be understood from the above discussion, according to the present invention, zooming and focusing can be effected at one time in the same manner as in a zoom lens having no reflex optical lens. That is, when the actuation portion 11 of the front frame 10 operates to axially move the front frame 10, the zooming ring 5 rotates about the optical axis by means of the engagement of the pin 8 in the cam groove 18. The rotation of the zooming ring 5 causes the rear frame 14 to move with the help of the pin 15 fitted in the lead groove 17 of the zooming ring 5, so that a focal length of the reflex and transmission optical lens means varies. In order to change and adjust a focal length of a zoom lens of a combination of the reflex optical lens means and the transmission optical lens means and to provide a one-hand zoom by means of the front frame 10, it is absolutely necessary to provide the front cam groove 18 and the rear lead groove 17, which are inclined in the same direction. For example, as shown in FIG. 3, in case of a front cam groove 18' which includes an inflection point, it is very difficult to provide a one-hand zoom type of zooming operation system.

It should be noted that the inclined angles A and B of the grooves 17 and 18 with respect to the line L parallel to the optical axis are very important factors, in order to provide a smooth one-hand zoom operation. It was experimentally confirmed that optimum inclined angles A and B were both 30°~60°.

A pair of zooming guide grooves (i.e. the cam groove 18 and the lead groove 17) of the zooming ring 5 may be both cam grooves. Furthermore, the front cam groove 18 and the rear lead groove 17 can be replaced by a front lead groove and a rear cam groove, respectively.

Since the outer helicoid ring 7 does not rotate when the front frame 10 is rotated, the focusing can be effected by the front frame 10.

When the front frame 10 is rotated, the reflex optical lens means is axially displaced by means of the engagement of the two helicoids H and h without rotating the outer helicoid ring 7 to effect focusing.

Figure 4:
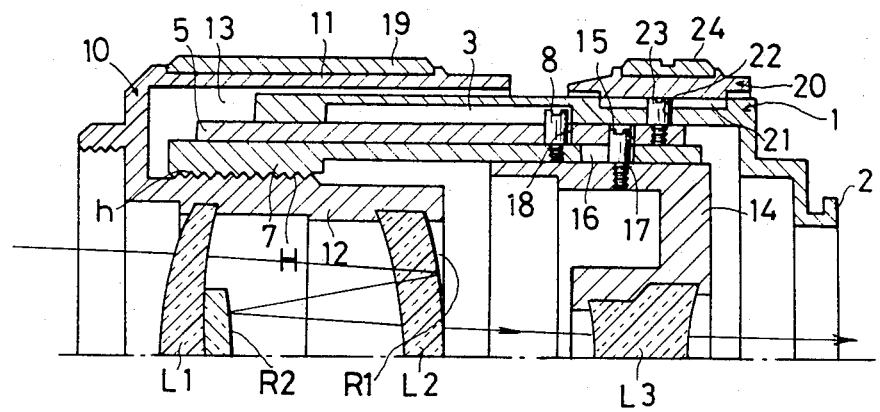

FIG. 4 shows a different embodiment of the present invention, in which an additional zooming operation ring 20 is provided for actuating the zooming ring 5. The ring 20 is rotatably but not axially movably mounted to the outer periphery of the rear end of the mount securing barrel 1. The zooming operation ring 20 has an axially extending straight groove 21 on its inner face. The zooming ring 5 has a pin 23 which extends through a peripheral guide groove 22 formed in the barrel 1 so that the operation ring 20 cam rotate on the barrel 1 about the optical axis. The front end of the pin 23 is located in the axial groove 21 of the operation ring 20. The numeral 24 designates a face ring provided on and secured to the zooming operation ring 20. Elements corresponding to the elements shown in FIG. 1 are designated by same reference numerals as those in FIG. 1.

According to the second embodiment illustrated in FIG. 4, not only focusing and zooming can be both effected at one time by the front frame 10 similar to the first embodiment illustrated in FIG. 1, but also only zooming can be effected by the zooming operation ring 20. That is, when the operation ring 20 is rotated, the zooming ring 5 is rotated by means of the pin 23 located in the groove 21, so that the front frame 10 and the rear frame 14 come close to and away from each other with the help of the front cam groove 18 and the rear lead groove 17 to vary the focal length. Therefore, on the one hand, a quick zooming can be effected by the front frame 10, and, on the other hand, zooming independent of focusing can be effected by the operation ring 20 without changing a focusing state.

Figure 5:
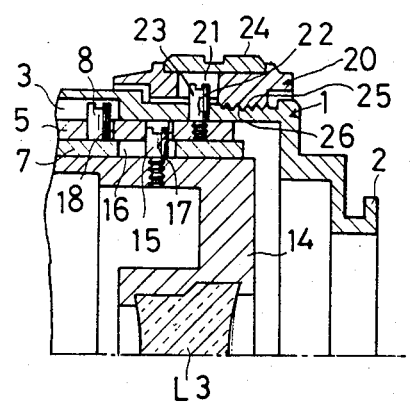

FIG. 5 shows another embodiment of the present invention in which the zooming operation ring 20 is provided, on its inner periphery, with a threaded portion 26 which is engaged by a threaded portion 25 formed on the outer periphery of the barrel 1. According to this embodiment, because of the screw engagement of the threaded portions 25 and 26, no play occurs between the zooming operation ring 20 and the barrel 1, unlike the embodiment illustrated in FIG. 4, so that when the operation ring 20 is rotated on the barrel with the help of the screw engagement, an undesirable and incidental displacement of the zooming operation ring occurs neither in a radial direction nor in an axial direction.

The invention has been described in detail with particular reference to preferred embodiments thereof, but it will be understood that variations and modifications can be effected without changing the basic scope of the invention as described herein above.

We claim:

1. A reflex zoom lens barrel comprising a front frame which carries reflex optical lens means having a positive focal length, a rear frame which carries transmission optical lens means having a negative focal length, zooming means for moving the front and rear frames in directions of an optical axis, to vary the focal length of the combination of the reflex and transmission optical lens means, and focusing means for independently moving only the front frame in the optical axial directions.

2. A reflex zoom lens barrel with a mount securing barrel to be connected to a camera body, comprising a front frame which carries reflex optical lens means having a positive focal length and which is movable in optical axial directions with respect to the mount securing barrel, a rear frame which carries transmission optical lens means having a negative focal length, a helicoid ring which is screw-engaged by the front frame, and a zooming ring which is rotatable for moving the front and rear frames relative to the mount securing barrel while keeping a predetermined positional relationship between the two frames, and which has a pair of guide grooves, said helicoid ring and said rear frame both having pins received in the corresponding guide grooves of the zooming ring, said guide grooves being inclined so that when the front frame is moved in the optical axial directions between two extremeties to effect zooming, the zooming ring is rotated by the axial displacement of the front frame to axially move the rear frame.

3. A reflex zoom lens barrel according to claim 2, wherein said front frame has a double-tubular construction consisting of an outer annular actuating portion and an inner annular supporting portion which defines, together with the outer actuating portion, a space therebetween in which said helicoid ring, said zooming ring and said mount securing barrel are located one on another in this order when viewed from the inner side, and wherein said mount securing barrel is provided, on its inner face, with an axial straight groove which receives the front end of said pin of the helicoid ring extending through the corresponding guide groove of the zooming ring, so that the front frame can axially move along the axial straight groove of the mount securing barrel, relative to the latter.

4. A reflex zoom lens barrel according to claim 2, wherein said rear frame is fitted in the helicoid ring and wherein said helicoid ring has an axial straight guide groove through which said pin of the rear frame extends into the corresponding guide groove of the zooming ring.

5. A reflex zoom lens barrel according to claim 2, wherein said guide grooves of the zooming ring consist of a linearly extending lead groove and a curved cam groove, both the lead and cam grooves being inclined at 30°~60° with respect to an optical axis.

6. A reflex zoom lens barrel according to claim 2,3,4 or 5, further comprising a zooming operation ring for actuating the zooming ring from the outside of the mount securing barrel.

7. A reflex zoom lens barrel with a mount securing barrel to be connected to a camera body, comprising a front frame which carries reflex optical lens means having a positive focal length and which is movable in optical axial directions with respect the mount securing barrel, a rear frame which carries transmission optical lens means having a negative focal length, a helicoid ring which is screw-engaged by the front frame, a zooming ring which is rotatable for moving the front and rear frames relative to the mount securing barrel while keeping a predetermined positional relationship between the two frames and which has a pair of guide grooves, and a zooming operation ring for actuating the zooming ring from the outside of the mount securing barrel, said helicoid ring and said rear frame both having pins received in the corresponding guide grooves of the zooming ring, said guide grooves being inclined so that when the front frame is moved in the optical axial directions between two extrmeties to effect zooming, the zooming ring is rotated by the axial displacement of the front frame to axially move the rear frame.

8. A reflex zoom lens barrel according to claim 7, wherein said zooming operation ring is screw-engaged by the mount securing barrel.

* * * * *

UNITED STATES PATENT AND TRADEMARK OFFICE
CERTIFICATE OF CORRECTION

PATENT NO. : 4,445,756
DATED : May 1, 1984
INVENTOR(S) : Shinsuke Kōmoto

It is certified that error appears in the above—identified patent and that said Letters Patent is hereby corrected as shown below:

On the title page, the following should be added:

--[73] Assignee: Asahi Kogaku Kogyo Kabushiki Kaisha, Tokyo, Japan--.

Column 2, line 26, cancel "land" and substitute --lead--.

Column 2, line 40, after "pin", insert --6--.

Column 5, line 14, cancel "extremeties" and substitute --extremities--.

Column 6, line 30, cancel "extrmeties" and substitute --extremities--.

Signed and Sealed this

Twenty-seventh Day of November 1984

[SEAL]

Attest:

GERALD J. MOSSINGHOFF

Attesting Officer    Commissioner of Patents and Trademarks